United States Patent [19]

Kamiguchi et al.

[11] Patent Number: 5,611,975
[45] Date of Patent: *Mar. 18, 1997

[54] MOLDING CONDITION SETTING METHOD FOR AN INJECTION MOLDING MACHINE

[75] Inventors: Masao Kamiguchi; Noriaki Neko, both of Minamitsuru-gun, Japan

[73] Assignee: Fanuc, Ltd., Yamanashi, Japan

[*] Notice: The term of this patent shall not extend beyond the expiration date of Pat. No. 5,296,179.

[21] Appl. No.: 406,806

[22] Filed: Mar. 20, 1995

Related U.S. Application Data

[63] Continuation of Ser. No. 80,653, Jun. 24, 1993, abandoned, which is a continuation of Ser. No. 720,760, Jul. 2, 1991, abandoned.

[30] Foreign Application Priority Data

Nov. 2, 1989 [JP] Japan ..................................... 1-284832

[51] Int. Cl.$^6$ .................................................. B29C 45/76
[52] U.S. Cl. ................... 264/40.1; 264/40.5; 264/328.1; 425/145; 425/149; 425/170; 364/475.08
[58] Field of Search .................. 264/40.1, 40.5, 264/40.7, 328.1; 425/135, 145, 149, 170; 364/476, 475.05, 475.08

[56] References Cited

U.S. PATENT DOCUMENTS

| | | | |
|---|---|---|---|
| 4,583,931 | 4/1986 | Fujita et al. | 425/170 |
| 4,708,620 | 11/1987 | Brugger | 425/170 |
| 4,718,841 | 1/1988 | Kiya | 425/170 |
| 4,774,675 | 9/1988 | Kagawa | 264/40.5 |
| 4,805,112 | 2/1989 | Neko | 364/191 |
| 4,889,667 | 12/1989 | Kojima et al. | 264/40.5 |
| 4,954,063 | 9/1990 | Iwamoto | 425/170 |
| 5,296,179 | 3/1994 | Kamiguchi et al. | 364/476 |

FOREIGN PATENT DOCUMENTS

| | | |
|---|---|---|
| 61-106219 | 5/1986 | Japan . |
| 61-125830 | 6/1986 | Japan . |
| 63-130326 | 6/1988 | Japan . |

Primary Examiner—Jill L. Heitbrink
Attorney, Agent, or Firm—Staas & Halsey

[57] ABSTRACT

In an injection molding machine which performs movement control such that the rotation and axial movement of a screw (1) in a cylinder (10) are controlled in accordance with set injection molding conditions and executes an injection process for injecting a plasticized resin, for use as an injection object, into a mold (12), an injection molding condition setting method for the injection molding machine comprises: information detection process for detecting information on a time-based pressure acting on the resin in the injection process by means of injection pressure sensors (4, 13, 14), etc.; a first display control process for causing a pressure curve corresponding to the pressure information detected in the information detection process to be displayed in a waveform display region provided in a screen of a CRT display device of a CRT/MDI (119); a second display control process for causing information on set values of the injection molding conditions to be displayed in a condition setting region provided in the screen of the CRT display device the moment the pressure curve is displayed when the display of the injection molding conditions is selected; and a condition setting process for setting the injection molding conditions in response to a modification of the set values displayed on the screen of the CRT display device. According to this method, the set values of the injection molding conditions can be modified while observing the pressure curve displayed on the screen of the CRT display device simultaneously therewith.

13 Claims, 3 Drawing Sheets

MOLDING CONDITION SETTING METHOD FOR AN INJECTION MOLDING MACHINE

This application is a continuation of application Ser. No. 08/080,653, filed Jun. 24, 1993, now abandoned, which is a continuation of application Ser. No. 07/720,760, filed Jul. 2, 1991, abandoned.

FIELD OF THE INVENTION

The present invention relates to an injection molding condition setting method for an injection molding machine, in which injection molding conditions are set in accordance with accurate information displayed on a display device.

DESCRIPTION OF RELATED ART

In an injection molding machine using a screw, a plasticized object of injection is fed forward with rotation of the screw while it is stirred. Then, the screw is advanced in the axial direction to inject the injection object into a mold. As a result, a molded product of the injection object, having a predetermined shape, is formed in the mold.

The quality of molded products depends on the time-based change of pressure (injection pressure) acting on the injection object at the time of inject/on. Accordingly, it is necessary to obtain the characteristic of an ideal pressure curve, which is indicative of the change of the injection pressure with time.

In this respect, some of conventional injection molding machines are so designed as to display set values of injection molding conditions, by which the injection pressure, etc. are determined, on the screen of a graphic display unit in accordance with an NC program, as disclosed in .Japanese Provisional Patent Publication No. 61-106219. Upon modification of these set values, the injection molding machine operates to inject the injection object with the modified injection pressure characteristic. Other injection molding machines are so designed as to display a pressure curve indicative of the injection pressure characteristic on the screen of the graphic display unit in accordance with a control program, as disclosed in Japanese Provisional Patent Publication No. 61-125830.

In the conventional injection molding machines, however, a process of displaying and setting the injection molding conditions is different from a process of displaying the pressure curve, so that the injection molding conditions and the pressure curve cannot be simultaneously displayed on the screen of the graphic display unit. In the case of ascertaining and modifying the set injection molding conditions based on the preceding pressure curve characteristic, therefore, an operation of changing the display on the graphic display unit is required between when the injection molding condition is set and when the pressure curve is ascertained. As a consequence, if the injection molding conditions are displayed on the graphic display unit, for example, a user will be delayed in setting the conditions, and will not be able to detect a change, if any, of the pressure curve characteristic during the setting operation. Thus, even if the pressure curve characteristic changes during the setting operation in the injection molding machine, the modification of the injection molding conditions sometimes may be made solely on the basis of the injection molding conditions obtained before the change of the pressure curve. Thus, a difficulty will be encountered such that the injection molding conditions cannot be accurately modified in dependence on the change of the pressure curve.

SUMMARY OF THE INVENTION

The object of the present invention is to provide a molding condition setting method for an injection molding machine, in which injection molding conditions can be set on the basis of accurate information on a change of pressure of an injection object with time, so that the efficiency of the injection molding condition setting operation can be improved.

In order to achieve the aforementioned object, according to the present invention, there is provided a molding condition setting method for an injection molding machine which is arranged to perform movement control of a screw in accordance with set injection molding conditions and execute an injection process for injecting a plasticized injection object. The molding condition setting method comprises: information detection process for detecting information on a time-based pressure acting on the injection object in the injection process; a first display control process for causing display means to display a change of pressure corresponding to the pressure information detected in the information detection process; a second display control process for causing the display means to display information on set values of the injection molding conditions, along with the pressure change, when the display of the injection molding conditions is selected; and a condition setting process for setting the injection molding conditions in response to a modification of the information on the displayed set values.

According to the present invention, as described above, a change of pressure of the injection object in the injection process with time, setting items of the injection molding conditions, and set value information are simultaneously displayed by means of the display means. Accordingly, the injection molding conditions can be set with reference to accurate information on the time-based pressure change of the injection object. As a result, according to the present invention, the efficiency of the injection molding condition setting operation can be improved.

DESCRIPTION OF THE PREFERRED EMBODIMENTS

Figure 1:
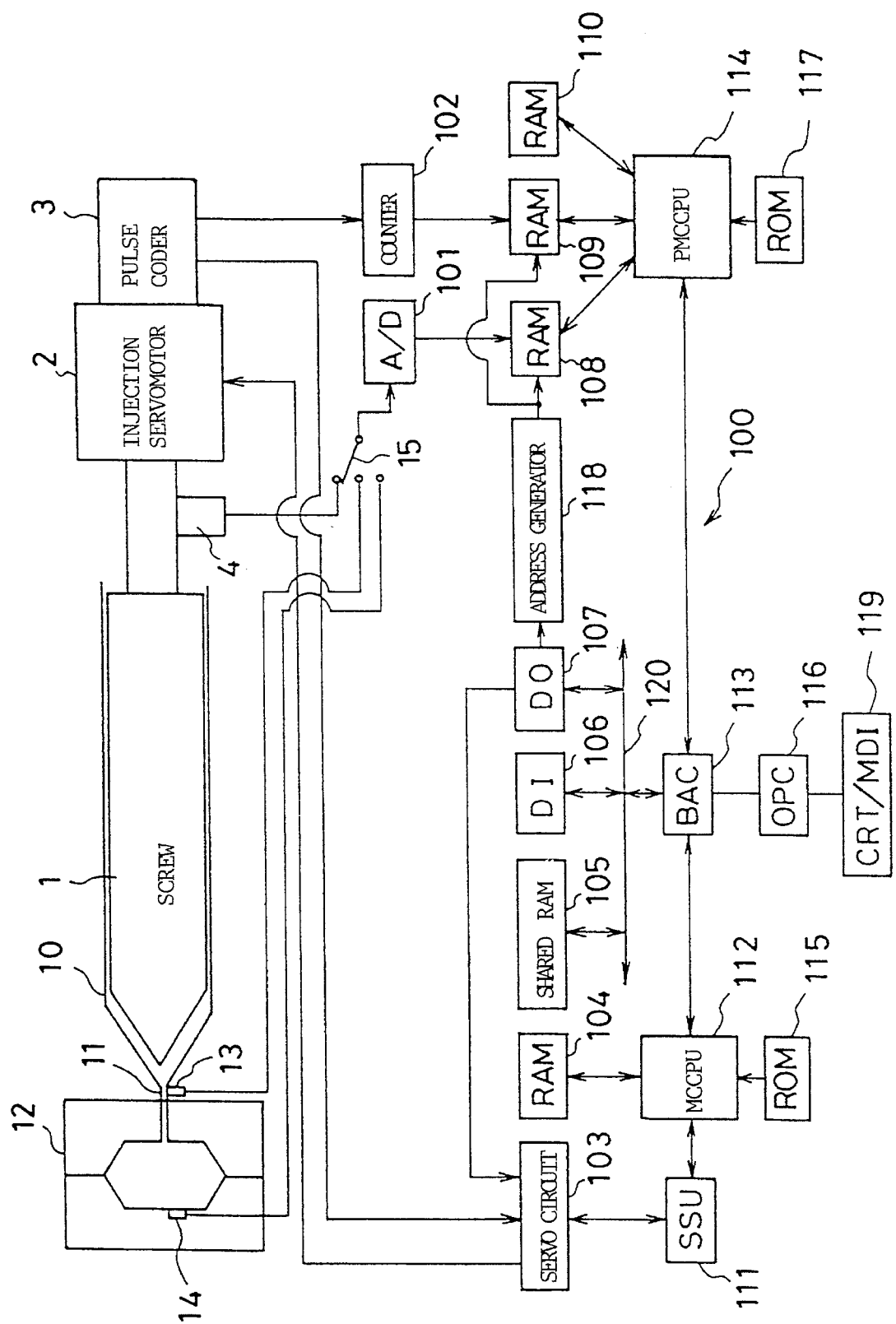
FIG. 1 is a functional block diagram showing an injection molding machine For embodying a molding condition setting method according to one embodiment of the present invention.

In FIG. 1, a cylinder 10 is filled with resin for use as an injection object. Disposed in the cylinder 10 is a screw 1, which is driven to rotate by means of a servomotor (not shown) For screw rotation, thereby feeding the resin forward From the screw while stirring the resin. The screw 1 is arranged to be driven to move axially in the cylinder 10 by a servomotor 2 for injection, thereby injecting the forwardly fed resin into a mold 12 through a nozzle 11 of the cylinder 10. The servomotors for screw rotation and injection, and servomotors (not shown) for clamping and ejector operation are controlled by means of a servo circuit 103.

The rotary shaft of the injection servomotor 2 is fitted with a pulse coder 3 which operates to output pulse signals corresponding to the rotational angle of the injection servomotor 2, thereby detecting the present position of the screw 1. The output pulses from the pulse coder 3 are successively integrated by means of a counter 102, and the integrated counter value is stored in a RAM 109 for screw position data, in a manner corresponding to a predetermined sampling period of an address generator 118. The screw 1 is further provided with an injection pressure sensor 4 for detecting a reaction Force, as the injection pressure of the resin, which acts in the axial direction of the screw during injection. The detected injection pressure is A/D-converted in an A/D converter 101, and is then stored in a RAM 108 for pressure data in a manner corresponding to the predetermined sampling period of the address generator 118. The address generator 118 successively delivers addresses to the RAMs 108 and 109 at intervals of the predetermined sampling period. More specifically, the address generator 118 successively outputs addresses, starting from a zero address, at intervals of the predetermined sampling period, after the generator is once cleared in response to an injection start command supplied from a PMCCPU 114 through a bus arbiter controller (hereinafter referred to as BAC) 113 and an output circuit 107. Hereinafter, the output from the address generator 118 will be referred to as a sampling command. According to the present invention, the injection pressure can be detected solely by the injection pressure sensor 4. Alternatively, however, the nozzle 11 and the mold 12 may be also provided with injection pressure sensors 13 and 14, respectively, as in the embodiment shown in FIG. 1, so that the injection pressure can be selectively detected by means of a changeover switch 15.

A numerical control device (hereinafter referred to as NC device) 100 comprises a microprocessor (hereinafter referred to as NCCPU) 112 for numerical control connected through the BAC 113, and a CPU 114 for a programmable machine control, let (hereinafter referred to as PMC). The NCCPU 112 is connected with the servo circuit 103 through a servo interface 111, and is also connected with a RAM 104 and a ROM 115.

The servo circuit 103 is connected with the injection servomotor 2, the pulse coder 3, and the output circuit 107, besides the servo interface 111. The servo circuit 103 is operable to drive the injection servomotor 2 in accordance with the pulse signals delivered from the pulse coder 3 and a torque limit value for controlling the output torque of the injection servomotor 2 outputted from the output circuit 107. The RAM 104 is temporarily stored with data for use in the NCCPU 112, and the like. The ROM 115 is stored with a management program according to which the CPU 112 generally controls the operation of the injection molding machine.

The PMCCPU 114 is connected with the RAM 108 for pressure data, the RAM 109 For screw position data, a RAM 110, and a ROM 117. The RAM 110 is stored with an execution program for the PMC. The ROM 117 is stored with a sequence program for controlling the sequence operation of the injection molding machine, and the like.

Figure 2:
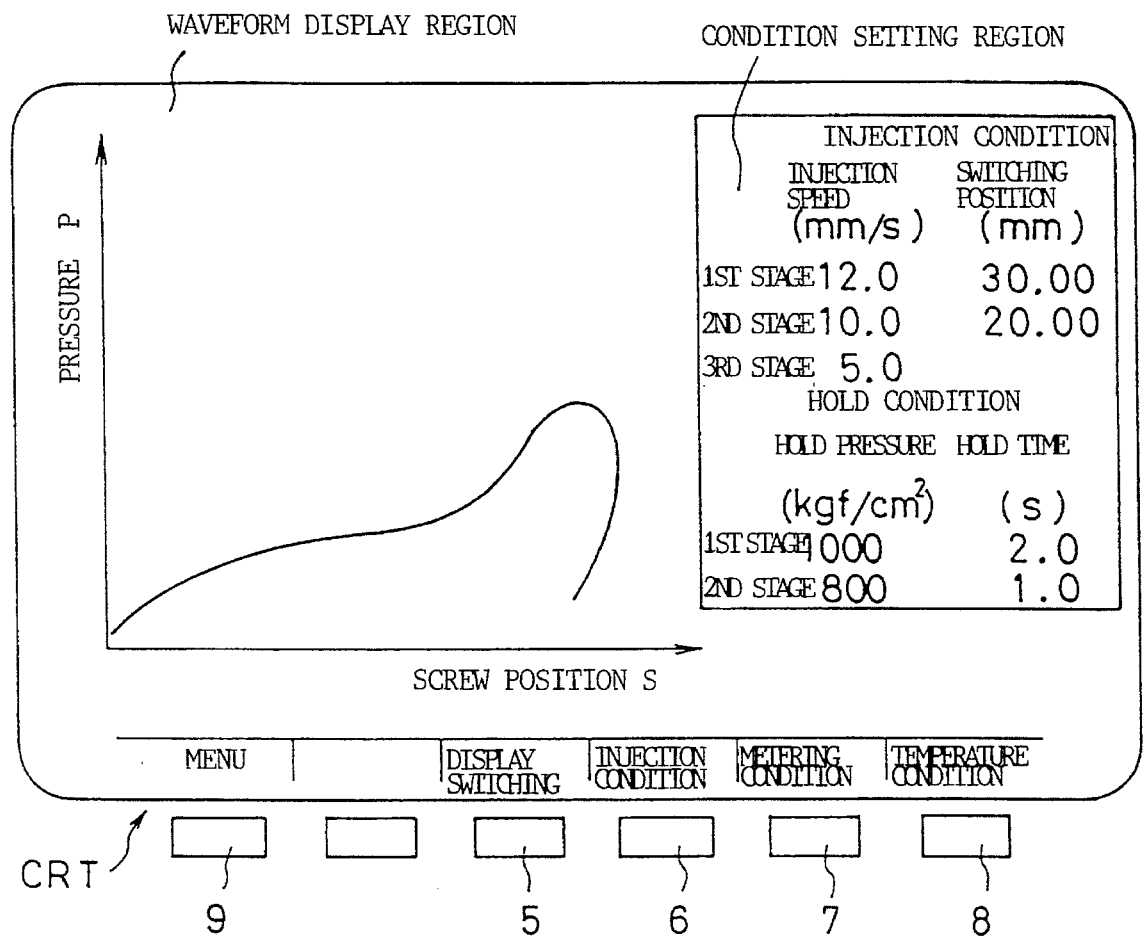
FIG. 2 is a diagram showing an example of display of a pressure curve and injection molding conditions according to the one embodiment of the present invention.
Figure 3:
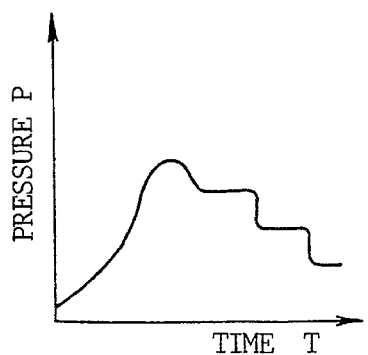
FIG. 3 is a diagram showing a pressure curve according to the one embodiment of the present invention.

The BAC 113 is connected with a shared RAM 105, an input circuit 106, and the output circuit 107 by means of the bus 120, and is also connected with the NCCPU 112, the PMCCPU 114, and an operator panel controller 116. The BAC 113 is operable to execute bus arbitration to meet data requirements (for data such as programs) from the NCCPU 112 and the PMCCPU 114 and the like, and output desired data. The operator panel controller 116 is connected with a manual data input device (hereinafter referred to as CRT/MDI) 119 mounted with a CRT display unit, which functions as a graphic display unit. As shown in FIGS. 2 and 3, the CRT/MDI 119 operates to display set values of injection molding conditions, a pressure curve indicative of a time-based injection pressure ,sod in one injection process, etc. on the screen of the CRT display unit. Further, the CRT/MDI 119 is so designed as to display the entry of various set data and a menu For use as a work object on the screen of the CRT display unit, and make menu selection in response to the operation of various operating keys (software keys, ten-keys, etc.).

The shared RAM 105, which is a nonvolatile RAM formed of a bubble memory or CMOS memory, comprises a memory section and a set memory section. The memory section is stored with an NC program for controlling the individual operations of the injection molding machine and the like, while the set memory section is stored with parameters of various molding conditions, such as injection, hold, and metering conditions, cylinder temperature, etc., various set values, macro variables, and the like.

In the NC device 100, on the basis of the NC program stored in the shared RAM 105, the various molding conditions, and the sequence program stored in the ROM 117, the PMCCPU 114 performs sequence control, while the NCCPU 112 distributes pulses for driving the injection servomotor 2 to the servo circuit 103 through the servo interface 111, thereby controlling the injection molding machine. The hardware configuration of these elements is similar to those of a conventional electric-powered injection molding machine.

The following is a description of a sampling process for the screw position and injection pressure according to the present invention.

Information on the injection pressure detected by the injection pressure sensor 4, and information on the screw position detected by the pulse coder 3 and the counter 102 are stored in a manner corresponding to common addresses of the RAMs 108 and 109 in response to the sampling command from the address generator 118. Namely, the output of the sampling command from the address generator 118 is started simultaneously when the injection of the injection molding machine is started in response to the injection start command from the PMCCPU 114. The information on the injection pressure and on the screw position for the up-to-date injection process is stored in the common address of the RAMs 108 and 109 at intervals of the predetermined sampling period, after the start of injection.

Table 1 illustrates the relationship between the injection pressure and the screw position with respect to the time elapsed after the start of injection, wherein T represents the time elapsed after the start of injection measured by the use of a sampling period $\gamma$; A, the common address of the RAMs 108 and 109; P, the injection pressure for each sampling cycle; and S, the screw position.

This sampling process ends when the injection ends, and the information stored in the RAMs 108, 109 is held until the next injection cycle starts and is reset simultaneously when the next injection cycle starts. Subsequently, a similar sampling process is repeatedly executed.

TABLE 1

| Elapsed Time T | γ | 2γ | ... | iγ | ... |
|---|---|---|---|---|---|
| Address A | 1 | 2 | ... | i | ... |
| Screw Position S | S1 | S2 | ... | Si | ... |
| Injection Pressure P | P1 | P2 | ... | Pi | ... |

Figure 4:
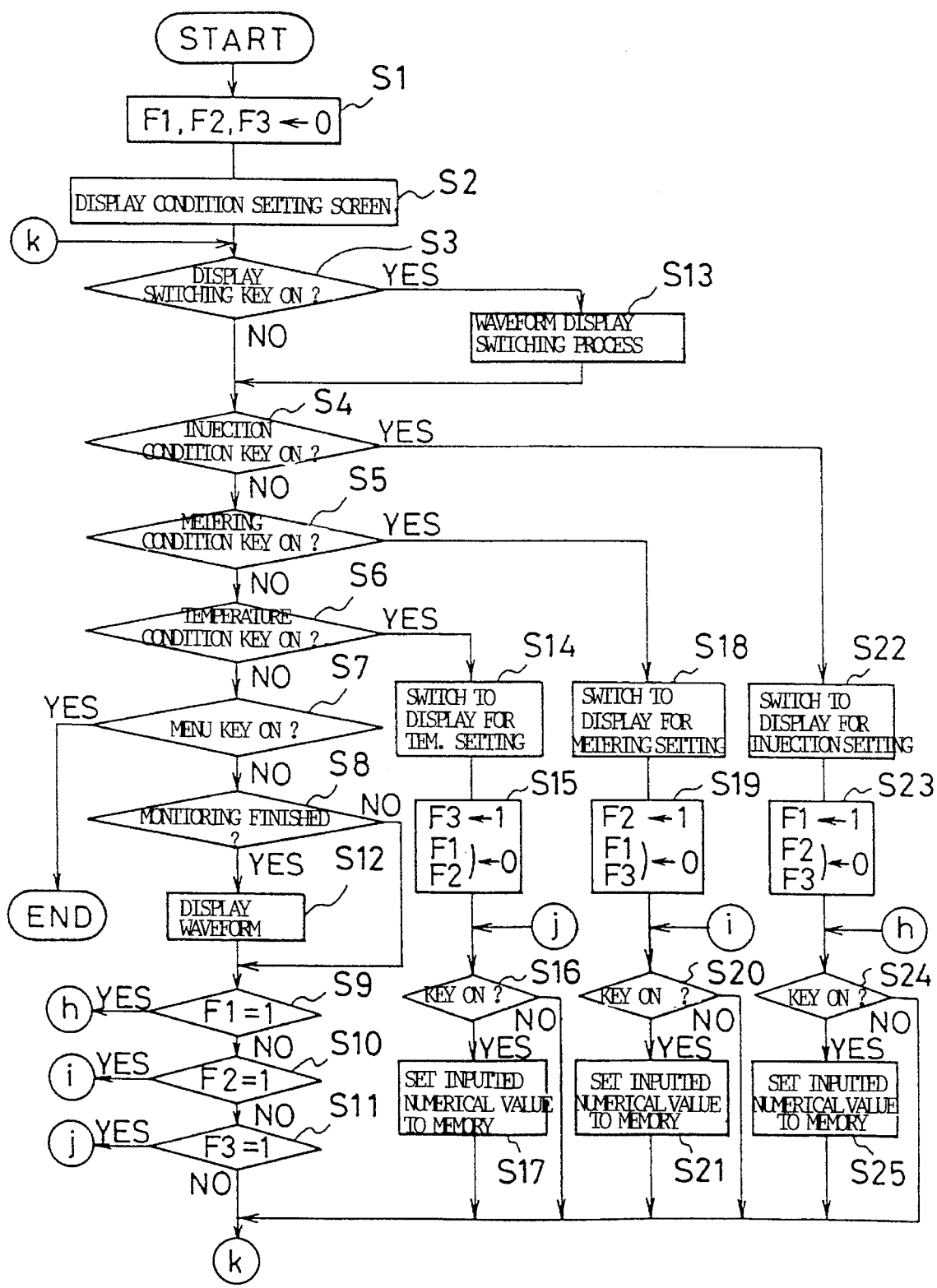
FIG. 4 is a flow chart illustrating a molding condition setting process executed by means of the injection molding machine of FIG. 1.

Next, with reference to the flow chart of FIG. 4, an injection molding condition setting method of the present embodiment will be described. In this embodiment, it is supposed that various injection molding conditions are already initialized and set in the set memory section of the shared RAM 105, and that the drive of the injection molding machine is controlled in accordance with these conditions. Flags F1 to F3 are flags which, provided corresponding to the various injection molding conditions, are used to select setting items for setting predetermined injection molding conditions. If the flags F1 to F3 are "1," they indicate a slate in which the setting items concerned are selected. If the flags F1 to F3 are "0," they indicate a state in which the setting items concerned are not selected.

A setting process operation for the injection molding conditions is started when the aforesaid setting process is selected by means of a function menu key (software key) 9 of the CRT/MDI 119.

When the setting process operation for the injection molding conditions is started, the PMCCPU 114 resets the flags F1, F2 and F3 (Step S1). Then, the display on the screen of the CRT display unit is switched to a display for injection molding condition setting, and some of the software keys of the CRT/MDI 119 are assigned individually as a display switching key 5, an injection condition setting key 6, a metering condition setting key 7, and a temperature condition setting key 8 (Step S2).

In the processes of Steps S3 to S7, a determination is made as to whether or not any of the assigned software keys 5 to 9 has been operated. Normally, the software keys 5 and 9 cannot be operated immediately after the start of the setting process, so that all the decisions in Steps S3 to S7 become negative (NO).

Thereupon, the PMCCPU 114 determines whether or not monitoring is finished (Step S8). More specifically, a determination is made in Step S8 as to whether or not all the information on the injection pressure and on the screw position for the up-to-date injection process is sampled and stored in the data RAMs 108, 109.

If the currently executed process is the injection process, then it indicates that a sampling command for the information on the injection pressure and the screw position is being executed. Thus, the decision in Step S8 becomes negative.

In the processes of Steps S9 to S11, it is determined whether or not the flags F1, F2 and F3 for setting item selection are reset. In the present phase, all the flags F1, F2 and F3 for setting item selection are reset, so that all the decisions in Steps S9 to S11 are negative. Then, the setting process operation of the PMCCPU 114 returns to Step S3, whereupon the same setting process as aforesaid is executed.

When the end of the monitoring is ascertained in Step S8 while the discrimination processes of Steps S3 to S11 are being repeatedly executed, the PMCCPU 114 proceeds to the process of Step S12. In Step S12, the PMCCPU 114 reads sampled information (information obtained by executing the sampling command) on the injection pressure stored in the RAM 108 for pressure data, and sampled information on the screw position stored in the RAM 109 for screw position data. Then, a pressure curve corresponding to the sampled information on the injection pressure is graphically displayed on the screen of the CRT display unit in accordance with a waveform display system selected in the preceding injection molding condition setting process (Step S12). This graphically displayed region is the waveform display region shown in FIG. 1.

If a waveform display system, indicative of the relationship between the screw position and the injection pressure, is selected in the preceding injection molding condition setting process, the PMCCPU 114 displays a pressure curve in a rectangular coordinate system in which the screw position and the injection pressure are respectively taken along abscissa S and ordinate P. More specifically, in the present embodiment, a screw position Si and an injection pressure Pi stored as sampled information in the same addresses of the RAMs 108, 109 are considered as forming a pair in the rectangular coordinate system, and points (Si, Pi), each composed of a corresponding one pair, are successively plotted on the waveform display region of the CRT display unit, whereby the pressure curve indicative of the relationship between the screw position and the injection pressure is displayed (see FIG. 1). On the other hand, if a waveform display system indicative of the relationship between the time elapsed after the start of injection and the injection pressure is selected in the preceding injection molding condition setting process, the PMCCPU 114 displays a pressure curve in a rectangular coordinate system in which the time elapsed after the start of injection and the injection pressure are respectively taken along abscissa T and ordinate P. Namely, an elapsed time iγ corresponding to the sampling period after the start of injection and the injection pressure Pi for each sampling period are considered as forming a pair in the rectangular coordinate system, and points (iγ, Pi) each composed of a corresponding one pair are successively plotted on the waveform display region of the CRT display unit, whereby the pressure curve indicative of the relationship between the time elapsed after the start of injection and the injection pressure is displayed (see FIG. 2). These individual waveform display systems are selected in response to the operation of the display switching key 5. More specifically, if an operator operates the display switching key 5, the PMCCPU 114 detects an on-state of the display switching key 5 in Step S3. Then, the PMCCPU 114 assigns subprograms of a waveform display process to be executed in Step S12 by a switching process operation for the waveform display. In the present embodiment, the subprograms include a subprogram for executing a waveform display indicating the relationship between the screw position and the injection pressure, and a subprogram for executing a waveform display indicating the relationship between the time elapsed after the start of injection and the injection pressure. In the waveform display switching process, these subprograms are alternately assigned by the on-off operation of the display switching key 5. In the waveform display switching process, moreover, the currently assigned subprogram is held until the display switching key 5 is operated again. Therefore, in the waveform display process immediately after the start of the injection molding condition setting process, the pressure curve is displayed in accordance with the waveform display system selected in the preceding injection molding condition setting process unless the display switching key 5 is operated.

If the display switching key 5 is operated immediately after the injection molding condition setting process is started and before the waveform display process is executed, the PMCCPU 114 concludes that a subprogram different from the one selected in the preceding process is assigned, and executes a waveform display process in accordance with the subprogram concerned. Since the pressure curve is not displayed before the waveform display process is executed, however, the operator cannot identify the waveform display system which is selected at the present point of time or which is permitted to be selected by operating the display switching key 5. Thus, it is insignificant to operate the display switching key 5 before the waveform display process is executed. On the other hand, in case that the PMCCPU 114 is enabled to cause the CRT display unit to visually display the currently selected waveform display system or the operator is permitted to discriminate the waveform display system with reference to the operating position of the display switching key 5, it is useful to operate the display switching key 5 before the waveform display process is executed.

In usual, the PMCCPU 114 causes the pressure curve to be tentatively displayed on the screen of the CRT display unit with use of the waveform display system selected under the preceding injection molding conditions, whereby the PMCCPU 114 allows the operator to identify the currently selected waveform display system. Then, in response to the operation of the display switching key 5 at the operator's request, the PMCCPU selects the desired waveform display system.

Further, the PMCCPU 114 causes the RAMs 108 and 109 to hold the information on the pressure curves displayed on the waveform display region until the next injection cycle ends. If the end of the monitoring is ascertained in Step S8 when the next injection cycle ends, the PMCCPU 114 causes the pressure curve for the up-to-date injection process to be displayed on the screen of the CRT display unit by executing the same waveform display process as aforesaid.

As a result, the waveform display region and the condition setting region are provided on the screen of the CRT display unit, and the pressure curve, the injection molding condition setting items, and the current set values thereof can be simultaneously displayed on the waveform display region and the condition setting region.

Thus, the operator, observing the pressure curve displayed on the screen of the CRT display unit, can recognize the injection molding condition setting items to be modified in order to make the pressure curve an ideal one. In setting the injection molding conditions, therefore, the screen need not be changed, so that the efficiency of the injection molding condition setting operation is improved.

Next, the operator operates the software keys for those setting items which are to be modified, among the injection condition setting key 6, the metering condition key 7, and the temperature condition setting key 8 corresponding to the setting items. When the software keys are operated, the PMCCPU 114 starts display processes for the details of the individual setting items and the current set values and processes for condition setting.

The following is a description of a processing operation of the PMCCPU 114 in the present embodiment executed in response to the operation of the injection condition setting key 6.

When the operator operates the injection condition setting key 6 while the discrimination processes of Steps S3 to S11 are being repeatedly executed, the PMCCPU 114 detects this operation in Step S4. The details of the setting items associated with the injection conditions and the current set values are displayed in the condition setting region on the screen of the CRT display unit (Step S22). In the present embodiment, the injection stage number, injection switching position, hold stage number, and hold time are displayed as the details of the setting items in the condition setting region. Also displayed in the condition setting region are numerical values (initial values in this case) which are stored as the current set values in the set memory section of the shared RAM 105, in a manner corresponding to the aforesaid individual items.

The PMCCPU 114 resets the flags F2 and F3 for setting item selection, sets the flag F1 for setting item selection, and stores the RAM 110 with the fact that the processes for injection condition setting are started (Step S23). Then, the PMCCPU 114 discriminates the presence/absence of a ten-key entry through the CRT/MDI 119 (Step S24).

If there is no ten-key entry, the processing operation of the PMCCPU 114 returns to Step S3, whereupon the discrimination processes of Steps S3 to S9 are executed. At this stage, the flag F1 for setting item selection is already set, so that the PMCCPU 114 executes the discrimination process of Step S9, and then proceeds to the process of Step S24. If there is no ten-key entry in Step S24, the discrimination processes of Steps S3 to S9 and Step S24 are repeatedly executed. Then, if the end of the monitoring is ascertained in the discrimination process of Step S8, the pressure curve For the up-to-date injection process is displayed on the screen of the CRT display unit, whereupon the program proceeds to the discrimination process of Step S9.

While the PMCCPU 114 is repeatedly executing the aforementioned processing operation, the operator, observing the displayed pressure curve, operates a cursor shift key of the CRT/MDI 119, thereby selecting the desired setting items from the details of the setting items displayed in the condition setting region on the screen of the CRT display unit, and operates the ten-keys to input new set values.

When the new set values inputted by means of the ten-keys are detected in Step S24, the PMCCPU 114 changes the display from the current set values of the setting items displayed in the condition setting region to the new set values. Further, the PMCCPU 114 causes the new set values to be stored in those storage regions of the set memory section of the shared RAM 105 which correspond to the aforesaid setting items, thereby updating the current set values (Step S25).

Thus, the injection operation of the injection molding machine can be controlled on the basis of the new current set values, updated in Step S25, in the next injection process and its subsequent ones. As the set molding conditions are modified in this manner, the characteristic of the pressure curve displayed in the waveform display region gradually changes. When the monitoring ends, however, the pressure curve for the up-to-date injection process is always displayed in the waveform display region, as in Steps S8 and S12.

Thereupon, the operator, observing the newly displayed pressure curve, determines whether or not the characteristic of this pressure curve is an ideal pressure curve characteristic. In other words, the operator determines whether or not the modification of the injection conditions is proper, and if necessary, selects any desired setting items by means of the software keys, and enters new set values by means of the ten-keys. In response to the entry of the new set values, the PMCCPU 114 further updates the injection conditions in the same manner as aforesaid.

TABLE 2

| | Metering Conditions | | |
|---|---|---|---|
| | Rotational Rate (rpm) | Back Pressure (kg/cm²) | Switching Position (mm) |
| First stage | 200 | 80 | 10.00 |
| Second stage | 150 | 60 | 18.00 |
| Third stage | 50 | 50 | 30.00 |
| Screw-back | | 35.00 (mm) | |
| Suck-back amount | | 5.00 (mm) | |
| Suck-back speed | | 10.0 (mm/s) | |

If the operator concludes that the metering conditions, cylinder temperature, etc. must be modified, moreover, he or she operates the metering condition setting key 7 or the temperature condition setting key 8. If the operation of the software key 7 or 8 is detected in Step S5 or S6, the PMCCPU 114 starts processes for metering condition setting or processes for temperature condition setting. The PMCCPU 114 executes the metering condition setting processes in Steps S18 to S21 or the temperature condition setting processes in Steps S14 to S17. Tables 2 and 3 illustrate examples of the setting items of the metering and temperature conditions displayed in the condition setting region on the screen of the CRT display unit. Since the flow of these processes is substantially the same as that of the processes for injection condition setting described before in connection with Steps S22 to S25, a detailed description of the process flow is omitted.

TABLE 3

| | Temperature Conditions | |
|---|---|---|
| | Set Values | Current Temperature |
| Nozzle | 240 (°C.) | 235 (°C.) |
| Front of cylinder | 233 (°C.) | 236 (°C.) |
| Back of cylinder | 249 (°C.) | 244 (°C.) |

If the PMCCPU 114 repeats the aforementioned injection molding condition setting processes to modify the various set values, including the injection conditions, metering conditions, cylinder temperature, etc., thereby obtaining an ideal pressure curve, the operator operates the function menu key 9 of the CRT/MDI 119 to select another display screen. When the function menu key 9 is operated, the PMCCPU 114 detects this operation (Step S7), whereupon the injection molding condition setting processes are finished.

Thus, according to the molding condition setting method of the present embodiment, the set values can be accurately modified even if the characteristic of the pressure curve fails to be stabilized at once due to the modification of the set cylinder temperature, which changes with a slow follow-up, or if the characteristic of the pressure curve fails to be stabilized at once due to the modification of the set metering conditions (e.g., screw-back), whose response to phenomena is slow, or if the molding condition setting is delayed. This is because the pressure curve for the up-to-date injection process can always be displayed on the screen of the CRT display unit according to the present embodiment.

We claim:

1. A method of resetting injection molding conditions, comprising the steps of:

simultaneously displaying current settings for injection molding conditions and a pressure in an object being injected, the pressure being displayed as a curved lined in a graph with pressure on one axis, and one of time and screw position on another axis, the current settings for injection molding conditions including at least one setting different than a pressure setting;

visually comparing the current settings for injection molding conditions and the pressure; and resetting the injection molding conditions based on the comparison of the current settings for injection molding conditions and the pressure.

2. A method of resetting injection molding conditions according to claim 1, wherein the injection molding conditions are reset by selecting an injection molding condition to be modified, inputting a new value for the setting of the selected injection molding condition, and storing the new value in memory means.

3. A method of resetting injection molding conditions according to claim 1, wherein the injection molding conditions are reset by selecting an injection molding condition to be modified, inputting a new value for the setting of the selected injection molding condition, and storing the new value in memory means.

4. A method of resetting injection molding conditions in an injection molding machine, comprising the steps of:

(a) detecting information on pressure acting to inject a plasticized material into a mold;

(b) simultaneously displaying the information on pressure and information on current settings for controlled injection molding conditions, the pressure being displayed as a curved line in a graph with pressure on one axis, and one of time and screw position on another axis, the current settings for .controlled injection molding conditions including at least one setting different than a pressure setting;

(c) visually comparing the information on pressure and the information on current settings; and (d) resetting the settings for controlled injection molding conditions based on the visual comparison of step (c).

5. A method of resetting injection molding conditions according to claim 4, wherein the information on pressure detected in step (a) is detected by detecting an axial force of a screw used for the injection.

6. A method of resetting injection molding conditions according to claim 4, wherein the information on pressure detected in step (a) is detected by detecting the pressure of the plasticized material as it enters the mold.

7. A method of resetting injection molding conditions according to claim 4, wherein the information on pressure detected in step (a) is detected by detecting the pressure of the plasticized material within the mold.

8. A method of resetting injection molding conditions according to claim 4, wherein the information on pressure is at least one of a change in pressure from the pressure at the-start of injection, detected repeatedly at a predetermined time interval and a change in pressure from the pressure at a time before a screw used for the injection is detected repeatedly at a predetermined screw position interval.

9. A method of resetting injection molding conditions according to claim 8, wherein one change in pressure is selected out of the pressure information and displayed in step (b).

10. A method of resetting injection molding conditions according to claim 4, wherein the information on pressure is a plurality of pressure changes and one pressure change is selected out of the plurality of pressure changes and displayed in step (b).

11. A method of resetting injection molding conditions according to claim 4, wherein the information displayed in step (b) is displayed on a graphic display unit.

12. A method of resetting injection molding conditions according to claim 4, wherein the settings for controlled injection molding conditions comprise injection speeds, switching positions, hold pressure conditions and temperature conditions.

13. A method of resetting injection molding conditions in an injection molding machine, comprising the steps of:

(a) displaying molding condition settings of an injection molding machine for an injection molding operation to be performed, said molding condition settings being displayed in a condition setting area of a display screen, the molding condition settings comprising injection speed, switching position, hold pressure and hold time;

(b) performing a molding operation in said injection molding machine in accordance with the molding condition settings displayed in said condition setting area;

(c) monitoring the molding operation and obtaining first data on resin pressure with respect to time elapsed from start of injection and second data on resin pressure with respect to screw position;

(d) displaying in a pressure curve displaying area of said display screen, either the first or the second data in the form of an actual pressure curve, according to a data selecting instruction from an operator;

(e) checking whether or not the actual pressure curve is in accord with a pressure curve which is considered desirable;

(f) modifying said molding condition settings if step (e) determines that the actual pressure curve is not in accord with the pressure curve which is considered desirable by manually correcting one or more of said molding condition settings displayed in said condition setting area;

(g) performing a molding operation in said injection molding machine in accordance with the molding condition settings modified in step (f);

(h) displaying in said pressure curve displaying area an actual pressure curve obtained by monitoring the molding operation performed in step (g); and (i) repeating steps (e) to (h) to have the actual pressure curve be in accord with the pressure curve which is considered desirable.

\* \* \* \* \*

UNITED STATES PATENT AND TRADEMARK OFFICE
CERTIFICATE OF CORRECTION

Page 1 of 2

PATENT NO. : 5,611,975
DATED : March 18, 1997
INVENTOR(S) : Masao KAMIGUCHI, et al.

It is certified that error appears in the above-indentified patent and that said Letters Patent is hereby corrected as shown below:

Title page,
Item [30], insert --Nov. 1, 1990 [JP] Japan .......PCT/JP90/01490--
Item [56], FOREIGN PATENT DOCUMENTS, insert --  62-23722    1/1987     Japan
    1-244818    9/1989     Japan
    126 174     11/1984    Europe
    215 939     4/1987     Europe --.

Under OTHER, insert

-- Patent Abstracts of Japan, Vol. 11, No. 360 (M-645) (2807), November 25, 1987 (JP 62-138221)

Patent Abstracts of Japan, Vol. 14, No. 361 (M-1006) (4304), August 6, 1990 (JP 2-128821)--.

| | | |
|---|---|---|
| Col. 1, | line 26, | change "inject/on" to --injection--. |
| Col. 2, | line 44, | change "For" to --for--; |
| | line 62, | change "For" to --for--; and |
| | line 63, | change "From" to --from--. |
| Col. 3, | line 40, | change "control," to --controller--. |
| Col. 4, | line 9, | change ",sod" to --used--. |
| Col. 5, | line 18, | change "slate" to --state--. |
| Col. 10, | line 31, | change "for .controlled" to --for controlled--; and |
| | line 53, | change "the-start" to --the start--. |

UNITED STATES PATENT AND TRADEMARK OFFICE
CERTIFICATE OF CORRECTION

PATENT NO. : 5,611,975
DATED : March 18, 1997
INVENTOR(S) : Masao Kamiguchi, et. al.

It is certified that error appears in the above-indentified patent and that said Letters Patent is hereby corrected as shown below:

Title page, item [56] References Cited, insert the following:
--Patent Abstracts of Japan, vol. 13, no. 582(M-911)(3930), December 21, 1989 (JP 1-244818.--.

Signed and Sealed this

Twenty-third Day of September, 1997

Attest:

BRUCE LEHMAN

*Attesting Officer*  *Commissioner of Patents and Trademarks*